US012455734B2

(12) United States Patent
Xu et al.

(10) Patent No.: US 12,455,734 B2
(45) Date of Patent: Oct. 28, 2025

(54) DEDUPLICATION OF COMPUTER PROGRAMS USING SIMILARITY MEASURES AND ARTIFICIAL INTELLIGENCE

(71) Applicant: SAP SE, Walldorf (DE)

(72) Inventors: Haiyang Xu, Shanghai (CN); Yuna Hou, Shanghai (CN); Fangling Liu, Shanghai (CN); Xiang Fan, Shanghai (CN); Xia Yu, Shanghai (CN); Wenle Zhao, Shanghai (CN); Jia Wang, Shanghai (CN); You Li, Shanghai (CN)

(73) Assignee: SAP SE, Walldorf (DE)

( * ) Notice: Subject to any disclaimer, the term of this patent is extended or adjusted under 35 U.S.C. 154(b) by 176 days.

(21) Appl. No.: 18/229,915

(22) Filed: Aug. 3, 2023

(65) Prior Publication Data
US 2025/0045043 A1    Feb. 6, 2025

(51) Int. Cl.
*G06F 8/70*    (2018.01)
(52) U.S. Cl.
CPC ..................... *G06F 8/70* (2013.01)
(58) Field of Classification Search
None
See application file for complete search history.

(56) References Cited

U.S. PATENT DOCUMENTS

| 11,036,867 | B2* | 6/2021 | Bhatia | H04L 63/1433 |
| 2013/0268916 | A1* | 10/2013 | Misra | G06F 8/315 |
| | | | | 717/123 |
| 2020/0174760 | A1* | 6/2020 | Fuchs | G06F 11/3698 |
| 2020/0219137 | A1* | 7/2020 | Zhu | G06F 8/70 |
| 2021/0256036 | A1* | 8/2021 | Luo | G06F 16/285 |
| 2022/0414492 | A1* | 12/2022 | Jezewski | G06N 5/04 |
| 2024/0265664 | A1* | 8/2024 | You | G06V 10/20 |

OTHER PUBLICATIONS

Alon et al., "A General Path-Based Representation for Predicting Program Properties," ACM, 2018. (Year: 2018).*
Eghbali et al., "CrystalBLEU: Precisely and Efficiently Measuring the Similarity of Code," ACM, 2022. (Year: 2022).*

* cited by examiner

*Primary Examiner* — Ryan D. Coyer
(74) *Attorney, Agent, or Firm* — Sterne, Kessler, Goldstein &Fox P.L.L.C.

(57) ABSTRACT

Various embodiments for deduplication of APIs using similarity measures and artificial intelligence are described herein. An embodiment operates by receiving a request to compare a first computing program to a second computing program, wherein each computing program includes an address, one or more tables accessed by a respective computing program, one or more input parameters, and one or more output parameters. Similarity measures are calculated between the addresses, tables, input parameters, and output parameters of the two computing programs. The similarity measures are provided to a trained artificial intelligence (AI) model, which generates a similarity determination. Performed an action based on the similarity determination.

20 Claims, 5 Drawing Sheets

200

210 — Receive a request to compare a first computing program to a second computing program, wherein each computing program comprises an address, one or more tables accessed by a respective computing program, one or more input parameters, and one or more output parameters

220 — Calculate an address similarity measure between the address of the first computing program and the address of the second computing program

230 — Calculate a table similarity measure between the one or more tables accessed by the first computing program and the one or more tables accessed by the second computing program

240 — Calculate an input similarity measure between the one or more input parameters of the first computing program and the one or more input parameters of the second computing program

250 — Calculate an output similarity measure between the one or more output parameters of the first computing program and the one or more output parameters of the second computing program

260 — Provide the address similarity measure, table similarity measure, input similarity measure, and output similarity measure to a trained artificial intelligence (AI) model

270 — Receive from the trained AI model a similarity determination between the first computing program and the second computing program

280 — Perform an action based on the similarity determination

FIG. 2

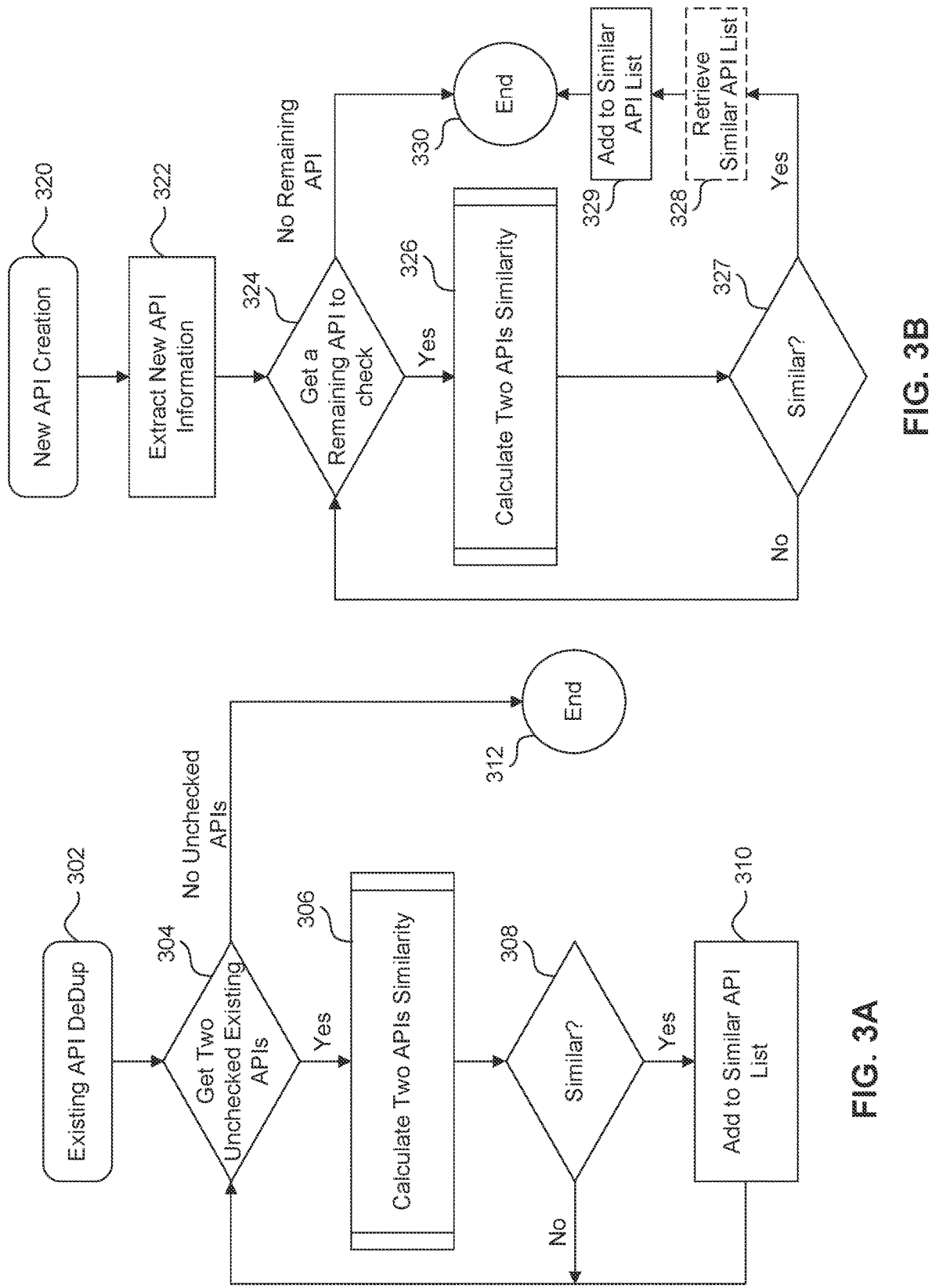

| Toolbar Icons 510 | | |
|---|---|---|
| API Name 502 | Similarity Score 504 | Editor (could allow for 2 or more editor windows) 506 |
| API #1<br>API #2 | 0.86 | (text from selected API) 508 |
| API #3<br>API #4 | 0.75 | |
| API #5<br>API #6 | 0.45 | |

DEDUPLICATION OF COMPUTER PROGRAMS USING SIMILARITY MEASURES AND ARTIFICIAL INTELLIGENCE

BACKGROUND

In organizations, particularly larger organizations, it is common that there may be multiple different teams developing programs that are similar to one another, even if applied to different purposes. One of the problems that arises is that programs with similar functionality consume greater computing resources to both store and maintain. Further, updates to one program may result in an optimization of that program, while the other program with similar functionality continues operating sub-optimally. It would be beneficial for an organization to be able to identify which programs have similar functionality.

BRIEF DESCRIPTION OF THE FIGURES

The accompanying drawings are incorporated herein and form a part of the specification.

FIG. 2 is a flowchart illustrating a process for a deduplication system (DS), according to some embodiments.

FIGS. 3A and 3B are flowcharts illustrating processes related to the functionality of a deduplication system (DS), according to some embodiments.

FIG. 5 illustrates a block diagram illustrating an example interface where result and recommendation may be provided to a user, according to some example embodiments.

In the drawings, like reference numbers generally indicate identical or similar elements. Additionally, generally, the left-most digit(s) of a reference number identifies the drawing in which the reference number first appears.

DETAILED DESCRIPTION

In organizations, particularly larger organizations, it is common that there may be multiple different teams developing programs that are similar to one another, even if applied to different purposes. One of the problems that arises is that programs with similar functionality consume greater computing resources to both store and maintain. Further, updates to one program may result in an optimization of that program, while the other program with similar functionality continues operating sub-optimally. It would be beneficial for an organization to be able to identify which programs have similar functionality.

Once identified, the similar programs may then be deduplicated and the redundancies or similarities reduced or eliminated entirely, which would ease the burdens of maintenance and improve system efficiency while reducing computing resource overhead to store, maintain, and operate the programs.

Figure 1:
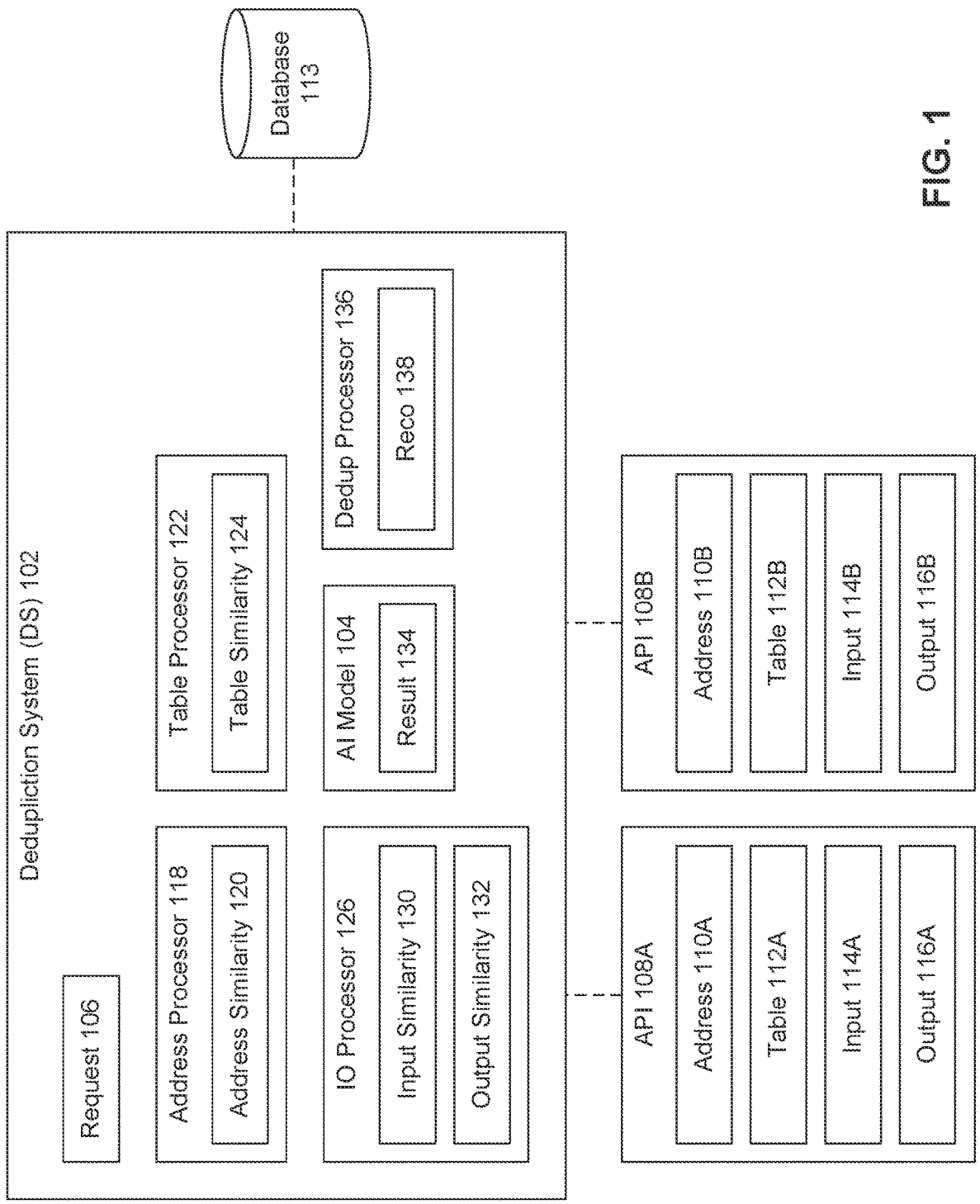
FIG. 1 illustrates a block diagram illustrating a deduplication system (DS), according to some example embodiments.

FIG. 1 illustrates a block diagram 100 illustrating a deduplication system (DS) 102, according to some example embodiments. In some embodiments, DS 102 may identify similarities between two different computing programs, based on comparing various dimensions or features of the programs as described in further detail below. In some embodiments, DS 102 may generate similarity scores based on the comparisons, and using an artificial intelligence (AI) model 104, determine whether or not the programs are similar enough to warrant deduplication, merging, refactorization, or other resource saving or combining processes. In some embodiments, DS 102 may recommend or perform any one of these processes between similar programs, in whole or in part reducing the functional overhead and cost of maintenance of a system, reducing the unnecessary redundancies between different programs.

For example, a first program or application programming interface (API) may be used to access company data and may be named EmployeeInfo. Within the same organization, or computing system, a second computing program or API which provides at least some similar functionalities may be named StaffInfo or even have the same name of EmployeeInfo, but with a different storage location, identifier, or uniform resource locator (URL). DS 102 may be used to compare the different APIs to determine whether or not the programs are similar enough to warrant deduplication. In some embodiments, DS 102 may recommend deduplication, provide an output indicating similarities and/or differences between the programs, and identify and/or perform one or more deduplication tasks between the programs or APIs.

In some embodiments, if a particular division of the organization is interested in building a new API for human resources or personnel data, DS 102 may be used to identify any preexisting APIs (e.g., EmployeeInfo, StaffInfo) which may already include existing or desired functionality. For example, a developer may provide an outline of the functionality requirements of the new API to be built, and DS 102 may identify whether any existing APIs include one or more of those desired functional requirements. This may enable the developer or development team to reuse existing functionality from existing programs or APIs, which would reduce production time, computing overhead, and computing resources that may otherwise be required to create a new API (e.g., by using pointers, inheritance, or other references between the APIs). In some embodiments, the developer may not build the new API at all because an existing API already provides the desired functionality.

In some embodiments, DS 102 may receive a request 106 to compare two different computing programs. The request 106 may be manually submitted by a user or developer, or may be a scheduled or periodic request 106 that is regularly performed by DS 102 (e.g., on a weekly or monthly basis). In some embodiments, the request 106 may identify a base program (e.g., which may include requirements for a new program to be developed) to compare to one or more other programs, and DS 102 may identify and perform a comparison of the base program to the one or more other programs to identify which other programs are similar to the base program.

In some embodiments, the computing programs to be compared may include an application programming interface (API) 108. In the example illustrated, the request 106 may identify or include details regarding a base API 108A, and DS 102 may compare base API 108A to one more other APIs 108B. As used herein, the term API 108 and APIs 108 may be used to refer to API 108A and/or API 108B, together or generally. Although described in the context of APIs 108, it is understood that DS 102 may compare any computing programs including but not limited to: object classes, apps, functions, APIs, or other programs.

APIs 108 may allow for two or more computer programs to communicate with each other, such as a type of software interface. Each API 108 may include various components, features or dimensions which may accord or correspond to an API specification. DS 102 may select a subset of the various API dimensions, by which to perform a similarity analysis between the APIs 108A, 108B. In some embodiments, DS 102 may use one or more of an address 110, table 112, input 114, and/or output 116 to perform a similarity analysis. In other embodiments, other features, elements, or dimensions of APIs 108 may be used for similarity analysis and comparison.

Address 110 is a term used to describe address 110A and address 110B (as illustrated) together or generally. Address 110 may include a unique identifier or address where a particular API 108 is stored. The address may include an indication of a device and one or more folders where at least one file the API 108 or a main file (e.g., executable file) is stored. In some embodiments, address 110 may comprise a uniform resource locator (URL) address that may identify a particular computer or disk location where API 108 is stored.

Table 112 is a term used to describe table 112A and table 112B (as illustrated) together or generally. Table 112 may indicate one or more tables of a database 113 that are used by the API 108. In some embodiments, table 112 may indicate the database 113 (in some embodiments, multiple different databases 113 may be used), table name, and/or field names that are being used by the corresponding API 108.

Input 114 is a term used to describe input 114A and input 114B (as illustrated) together or generally. Input 114 may indicate input parameters (if any) that are received by the API 108. In some embodiments, an input parameter may include both a label or name of a parameter and a corresponding data type. In some embodiments, the input parameter may include an object with its own parameters. In some embodiments, a particular API 108 may not include any input parameters, and input 114 may be NULL or an empty set.

Output 116 is a term used to describe output 116A and output 116B (as illustrated) together or generally. Output 116 may indicate output parameters that are the result of processing by the API 108. In some embodiments, an output parameter may include both a label or name of a parameter and a corresponding data type. In some embodiments, the output parameter may include an object with its own parameters. In some embodiments, a particular API 108 may not include any output parameters, and input 116 may be NULL or an empty set.

In some embodiments, DS 102 may select one or more of address 110, table 112, input 114, and output 116 for performing a similarity analysis between the APIs 108. As illustrated, in some embodiments, various specialized or configured processors may be used to perform the similarity analysis between like data features or dimensions of an API 108. For example, an address processor 118 may compute or calculate an address similarity 120.

In some embodiments, to calculate the similarity between the two URLs or addresses 110A, 110B, address processor 118 may perform data normalization and a similarity calculation. As noted above, address 110A may include a URL such as "/api/service/deployment/release/tags/{serviceKey}", which may also serve as a unique identifier of the API 108A. In data normalization, address processor 118 may split the URL into different words or identify different words from the URL, whereby different words are separated by the "/" or other symbol such as ":" or ";" or "_" or "<" or ">" (as examples) or any other delimiter (depending on the format of address 110).

In some embodiments, address processor 118 may then perform a lemmatization in which different inflected forms (such as "employ" and "employee") of the same root word (if any) may be grouped together. Address processor 118 may then generate one vector for each URL or address 110. In some embodiments, special characters, such as { }, :, and /, amongst others may be removed.

In some embodiments, address processor 118 may use the Jaccard similarity algorithm to perform a similarity calculation between the vectors generated from the different addresses 110A, 110B. In some embodiments, another similarity calculation (in addition to or in lieu of Jaccard may be used). The similarity calculation performed by address processor 118 may measure the similarity between two sets of data to identify which members or words are shared and distinct between the two data sets. Address processor 118 may compare the vectors generated from the URLs or addresses 110A, 110B.

Example pseudocode illustrating example processing performed by address processor 118 is provided below:

```
double calculateUrlSimilarity(String url1, String url2) {
    Vector v1 = urlNormalization(url1)
    Vector v2 = urlNormalization(url2)
    return sharedItemCount(v1, v2) / distinctItemCount(v1, v2)
}
Vector urlNormalization(String url) {
    Vector v = url.splitBy("/")
    foreach word in v {
        word = lemmatization(word)
    }
    return v
}
```

In the process outlined by the pseudocode above, first each vector is normalized (with a call to the urlNormalization method), and then the similarity between the vectors is calculated and an address similarity 120 is returned. In some embodiments, address similarity may include a value between 0 and 1.

As an example, addresses 110A, 110B may respectively include the following URLs:
1. /api/service/deployment/release/tags/{serviceKey}
2. /api/service/deployment/release/info/serviceKey}/{releaseTag}

Address processor 118 may perform data normalization to transform the addresses 110A, 110B into the following respective vectors:
1. [api service deployment release tag serviceKey]
2. [api service deployment release info serviceKey releaseTag]

Address processor 118 may perform a similarity analysis on the vectors and determine that there are 5 shared elements or items between the vectors [api, service deployment release serviceKey], amongst the 8 combined distinct items between the vectors [api, service deployment release serviceKey tag info releaseTag]. Thus, address processor 118 may calculate the address similarity 120 to be 5/8=0.625.

A table processor 122 may generate, calculate, or compute a table similarity 124 for the table 112 values from the APIs 108. Table similarity 124 may be a value that indicates a level of similarity between the tables of data (or columns or rows of data) being read, modified, updated, or otherwise accessed by the APIs 108. In some embodiments, table processor 122 may perform a similarity analysis on a table level. In some embodiments, table processor 122 may perform a similarity analysis on a field level (e.g., in which each table includes one or more fields (columns/rows) of data which may be referenced by an API 108).

As noted above, table 112 may include list of table names/identifiers (and or field names/identifiers) accessed by the corresponding API 108. In some embodiments, table processor 122 may use a similarity algorithm, such as Jaccard processing, to compute table similarity 124 between table 112A and table 112B. In some embodiments, table processor 122 and address processor 118 may use the same similarity processing algorithm (e.g., Jaccard), or each processor 118, 122 may use its own processing algorithm which may be different from the algorithms used by other processors.

Example pseudocode illustrating example processing performed by table processor 122 is provided below:

```
double calculateTablesSimilarity(Vector tableList1, Vector tableList2) {
    if(tableList1 is empty AND tableList2 is empty) {
        return 0.5
    }
    return sharedItemCount(tableList1, tableList2) /
distinctItemCount(tableList1, tableList2)
}
```

In the example pseudocode above, table processor 122 may first check to see if an API 108 includes a list of data fields or table names (e.g., table 112) that are being accessed by the API 108. In some embodiments, an API 10 may not refer or include references to any particular tables of database 113. If no values for table 112 are detected for either table 112A or table 112B, then in some embodiments, a default value of 0.5 may be assigned as table similarity 124.

In other embodiments, different values may be used for table similarity 124 if either table 112A or table 112B is an empty set. In some embodiments, if table 112A includes a set of values, and table 112B is an empty set, table processor 122 may generate a value of 0 indicating there is no overlap or similarity in the accessed tables or data fields, or may provide a value of 0.5 as illustrated in the pseudocode above.

As an example of the processing performed by table processor 122, tables 112A, 112B may respectively include the following values:
1. [t_user_info, t_department_info]
2. [t_user_info, t_class_info, t_student_info]

Table processor 122 may perform a similarity analysis on the vectors and determine that there is 1 shared item between the vectors [t_user_info], amongst the 4 combined distinct items between the vectors [t_user_info, t_department_info, t_class_info, t_student_info]. Thus, table processor 122 may calculate the table similarity 124 to be 1/4=0.25.

An input-output (IO) processor 126 may generate, calculate, or compute an input similarity 130 for inputs 114 and/or an output similarity 132 for outputs 116. Input similarity 130 may be a value that indicates a level of similarity between the input parameters or values being received by the APIs 108, while output similarity may be a value that indicates a level of similarity between the output parameters or values or results being generated or output by the APIs 108.

With regards to the input similarity 130 calculation, many APIs 108 will have input parameters which will be used in implementation, such as a path parameter or URL parameter, request parameter, request body, or other parameters. However, as described above, some APIs 108 may not include any inputs 114, in which case IO processor 126 may assign a default value to input similarity 130 if one or more of the inputs 114, 114B is an empty or null set.

In some embodiments, IO processor 126 may use a bidirectional encoder representations from transformers (BERT) system or architecture to detect the similarity between inputs 114A, 114B. In some embodiments, IO processor 126 may use a sentence-BERT (SBERT) system to perform the similarity comparison. SBERT may be a modification of the pretrained BERT network that uses Siamese and triplet network structures to derive semantically meaningful sentence embeddings that can be compared using cosine-similarity. However, prior to providing inputs 114A, 114B to SBERT, IO processor 126 may first normalize or otherwise reformat the inputs 114A, 114B.

In some embodiments, inputs 114 may not be flat structures, and in some embodiments, may include nested data structures, such as an object. IO processor 126 may perform data normalization to flatten the inputs 114 and prepare them for processing by SBERT. The flattened versions of the inputs 114 may be arranged in a sentence structure with elements of nested object being combined with a "." or other delimiter. For example, input 114A may include the following objects:

Student Teacher
    String name; String name;
    Int age; List<Student> students;
    Int age;

IO processor may flatten the input 114A into the following sentence structure "string.name list.student.students.name list.student.students.age int.age". A similar processing may be performed with input 114B, if needed.

Example pseudocode illustrating example processing performed by IO processor 126 is provided below:

```
double calculateParamObjectSimilarity(Object param1, Object param2)
{
    if(param1 is empty OR param2 is empty) {
        return 0.5
    }
        String s1 = paramObjectNormalization(param1, null)
        String s2 = paramObjectNormalization (param2, null)
    return sbertSimilarity(s1, s2)
}
String paramObjectNormalization(Object param, String prefix) {
    String result = ""
    for(Field f in param) {
        if(f is Object) {
            result += paramObjectNormalization(f, f.type + "." + f.name +
            ".")
        } else {
            result += (f.type + "." + f.name + " ")
        }
    }
    return prefix is empty ? result : prefix + "." + result
}
```

In the example pseudocode above, IO processor may check to ensure whether there are actually input parameters 114, if there are no input parameters 114 for a particular API 108, a default value of 0.5 may be returned as input similarity 130. As described above, with respect to table similarity 124, in other embodiments, different default values between 0-1 may be selected for situations in which either input 114A or 114B includes an empty set.

If there are values in inputs 114A and 114B, the inputs may be normalized or flattened as described above into sentence structures, if needed. The sentence structures may be then be provided to SBERT, which may return an input similarity 130 between 0-1. The same or similar process as described above may be repeated or performed by IO processor 126 with regards to outputs 116A, 116B, in generating output similarity 132.

The result of the processors 118, 122, 126 may be four values for the similarity measures 120, 124, 130, and 132 all between 0-1 (or some other defined range). In some embodiments, one or more of the address similarity 120, table similarity 124, input similarity 130, and output similarity 132 may be provided to the AI model 104 for processing to determine a result 134 with regards to whether or not API 108A and API 108B are similar.

In some embodiments, all four similarity values 120, 124, 130, and 132 may be provided as input to AI model 104. In some embodiments, any similarity values which indicate a missing input parameter or variable (e.g., such as an empty set or NULL attribute with regard to address 110, table 112, input 114, or output 116) may be excluded, and three or fewer parameters may be provided to AI model 104. Or, as described above, the default value of 0.5 may be used and provided to AI model 104. In some embodiments, additional, fewer, or different similarity values may be provided to AI model 104 to generate result 134. In some embodiments, result 134 may be a binary value True/False or 0/1 indicating whether or not the system as determined that API 108A and 108B are similar.

Based on the result 134, a deduplication (dedup) processor 136 may generate a recommendation (reco) 138. The reco 138 may include simply outputting the results of processing and comparing two or more APIs 108 to each other. The reco 138 may include an indication as to which APIs 108 are similar and/or may be combined, merged, refactored, or otherwise reformatted. For example, if there are 10 APIs 108 that are being compared to each other, the reco 138 may indicate which APIs 108 were detected to be similar to each other. For example, DS 102 may compare API 1 to API 2, API 1 to API 3, all the way to API 10, and then may compare API 2 to API 3, and so on, until all the APIs have been compared. As used herein, the term API and computer program may be used interchangeably, as API may be a type of computer program.

In some embodiments, dedup processor 136 may perform deduplication on one or more of the matching or similar APIs 108. For example, dedup processor may delete a function from API 108B if the function appears both API 108B and 108A, and replace the function in API 108B with a call to the function in API 108A. In this way, there is greater system consistency, the APIs 108A, 108B consume less space, and are easier to maintain, as the function only needs to be updated once in API 108A. In some embodiments, dedup processor 136 may log the changes performed, and provide a user with the log and the option of rolling back one or more of the changes.

FIG. 5 illustrates a block diagram illustrating an example interface 500 where result 134 and recommendation 138 may be provided to a user, according to some example embodiments. In some embodiments, the interface 500 may generated by DS 102. 510 may be a toolbar with various selectable user interface items (e.g., menus, buttons, etc.) that provide access to the functionality described herein.

Column 502 may list the names of the APIs 108 that were compared to each other, and column 504 may indicate a value of the result 134. In the illustrated example, rather than providing a binary or true/false indication of similarity, in some embodiments, AI model 108 may output a result 134 as a raw score (e.g., between 0-1) that reflects the degree of similarity between two compared APIs 108. In the example illustrated, the comparison of API 1 to API 2 resulted in a score of 0.86, which is a higher similarity than API 3 and API 4 which resulted in a score of 0.75.

Panel 506 may be an example of computer program editor or API editor, where the text of one or more of the APIs may be displayed and/or edited in window 508. For example, if a user selects API 1, the code for API 1 may be displayed in window 508. However, if the user selects the similarity score 0.86, the code of API 1 may be displayed in a first portion of 508, and the code for API 2 may be displayed in a second portion of 508. This may allow the user to see the code of the two APIs side-by-side.

In some embodiments, upon selection of the similarity score 0.86 from column 504, DS 102 may display a function in both API 1 and API 2 (if any) that were deemed similar to each other, or for which some modification was recommended 138. In some embodiments, the user may edit (and compile and test) the code of one or more the APIs through window 508. In some embodiments, after editing (and/or compiling and testing) the code of one or more of the APIs, the new version of the API(s) may be saved as temporary versions.

In some embodiments, the user may request DS 102 to re-run a similarity analysis on the updated code or temporary versions directly from the interface 500. This new similarity score may be provided in a new column or side by side the previous similarity score. For example, if API 2 was modified by the user, and a new similarity analysis was performed by DS 102, then the similarity score 504 column may be updated to 0.86|0.62, indicating the previous and new scores. In some embodiments, DS 102 may include labels or other visual formatting to indicate the differences between the scores. The remaining rows may continue to show their original scores of 075 and 045 respectively.

The user may then continue to update the API(s) until the similarity score 504 drops below a particular threshold (which may be identified by the system or user). Once the threshold has been reached, the user may replace the original version of the API (which may be saved in a disk or other location) with the updated temporary versions.

In some embodiments, DS 102 may determine whether the similarity measure between two APIs is above a threshold value (e.g., 0.70). Based on the determination, that both API1: API2 and API3: API4 exceed the threshold value, DS 102 may automatically launch one or more windows or editors 508 allowing the user to edit the code of the APIs. If multiple APIs exceed the threshold, DS 102 may ask the user which APIs the user wants to edit first, may first open the APIs with the highest similarity measure, or may open multiple instances of the editor 508 in different windows 508.

Returning to FIG. 1, n some embodiments, AI model 104 may be trained with a set of training data. For example, a training data set may be (x, y), where x represents a tuple of attributes describing a sample set of similarity measures. In some embodiments, each sample may have two sets of 4 attributes with normalized values [0,1] in each dimension, as described in the examples above address similarity 120, table similarity 124, input similarity 130, and output similarity 132. In the training data, y represents a label, namely 0/1 to indicate if a pair of APIs is similar/identical or not.

In some embodiments, a portion of the training data may be reserved to test the AI model 104. This may allow for measuring how well the AI model 104 works on new data that was not used during training. In some embodiments, linear regression may be used to build the AI model 104. Linear regression may allow the AI model 104 to model the relationships between scalar dependent variable y and x. This means that linear regression is the algorithm which learns the dependency between each known x and y, such that later the AI model 104 can be used to predict y for an unknown sample of x. In other embodiments, other algorithms or models may be used other than linear regression model, which include, but are not limited to, a neural network, support vector machine, decision tree, and k-nearest neighbors algorithm (KNN).

FIG. 2 is a flowchart illustrating a process 200 for a deduplication system (DS) 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to the figures.

In 210, a request to compare a first computing program to a second computing program is received. For example, DS 102 may receive a request 106 to compare API 108A to API 108B. Each API 108 may include various dimensions or parameters, including, but not limited to: address 110, table 112, input 114, and output 116.

In 220, an address similarity measure between the address of the first computing program and the address of the second computing program is calculated. For example, address processor 118 may generate, compute, or calculate an address similarity 120 between addresses 110A, 110B.

In 230, a table similarity measure between the one or more tables accessed by the first computing program and the one or more tables accessed by the second computing program is calculated. For example, table processor 122 may generate, compute, or calculate a table similarity 124 between tables 112A, 112B.

In 240, an input similarity measure between the one or more input parameters of the first computing program and the one or more input parameters of the second computing program is calculated. For example, IO processor 126 may generate, compute, or calculate an input similarity 130 between inputs 114A, 114B.

In 250, an output similarity measure between the one or more output parameters of the first computing program and the one or more output parameters of the second computing program is calculated. For example, IO processor 126 may generate, compute, or calculate an output similarity 132 between outputs 116A, 116B.

In 260, the address similarity measure, table similarity measure, input similarity measure, and output similarity measure are provided to a trained artificial intelligence (AI) model. For example, DS 102 may provide the address similarity 120, table similarity 124, input similarity 130, and output similarity 132 to AI model 104 for processing. AI model 104 may be trained to perform comparisons and determine whether or not the APIs 108A, 108B are similar and generate a result 134.

In 270, a similarity determination between the first computing program and the second computing program is received from the trained AI model. For example, dedup processor 136 may receive the result 134 from AI model 104 and generate a reco 138.

In 280, an action is performed based on the similarity determination. For example, dedup 136 may perform reco 138 which include displaying results of comparisons between different APIs 108, recommending which APIs 108 could be combined, and/or performing deduplication between the APIs 108 which are identified as being similar.

FIGS. 3A and 3B are flowcharts illustrating processes related to the functionality of a deduplication system (DS) 102, according to some embodiments. FIG. 3A illustrates a first use case in which DS 102 may be used to identify which existing APIs are similar to each other (302). At 304, two unchecked existing APIs may be retrieved from a database 113 or other storage locations (e.g. as indicated by addresses 110A, 110B). At 306, the similarity of the two APIs may be calculated as described above with respect to calculating the various similarity measures (120, 124, 130, 132) and submitting them to the AI model 104 for a result 138.

At 308, if the result 138 indicates that the APIs are similar, then at 310 the APIs may be added to a list of similar APIs. Otherwise, the process may return to 304, at which point one or more APIs may be received and checked. For example, if in the first interaction API A is compared to API B, then in the next iteration, API A can be compared to API C. Once all the designated APIs have been checked against each other, the process may end at 312.

FIG. 3B illustrates a second use case in which DS 102 may be used to identify whether an existing API is similar to a new API that is being designed (but which may not yet be implemented) (320). At 322, the information about the new API or its requirements may be retrieved from a design document API, API shell, input by a user, or retrieved from another location. This information may include the address 110, table 112, input 114, and output 116 information—to whatever extent available. At 324, a remaining API may be retrieved. The remaining API may be unchecked with respect to the new API or its requirements.

At 326, the new API information may be compared against the existing API information, and if they are similar, or no APIs remain to be checked, the process may end 330. If they not similar, the program may repeat at 324, and the new API information may be compared to a different existing API at 324, until there are no more remaining APIs to check, at which point the process may end at 330.

In some embodiments, once a single match is identified in 327, at 328, the system may retrieve from a list any other APIs that have been determined to be similar to the matching API (if any), add the matching API to a similar API list and provide the similar API(s) to a user at 329, and ending the process at step 330. In some embodiments, DS 102 may continue comparing the new API information against all the existing APIs that have been selected, and output a list of one or more existing APIs that are similar to the new API. Based on the list of matching existing APIs, a developer may decide that the new API does not need to be built at all, or that it can leverage existing functionality of the similar API(s), if any.

Figure 4:
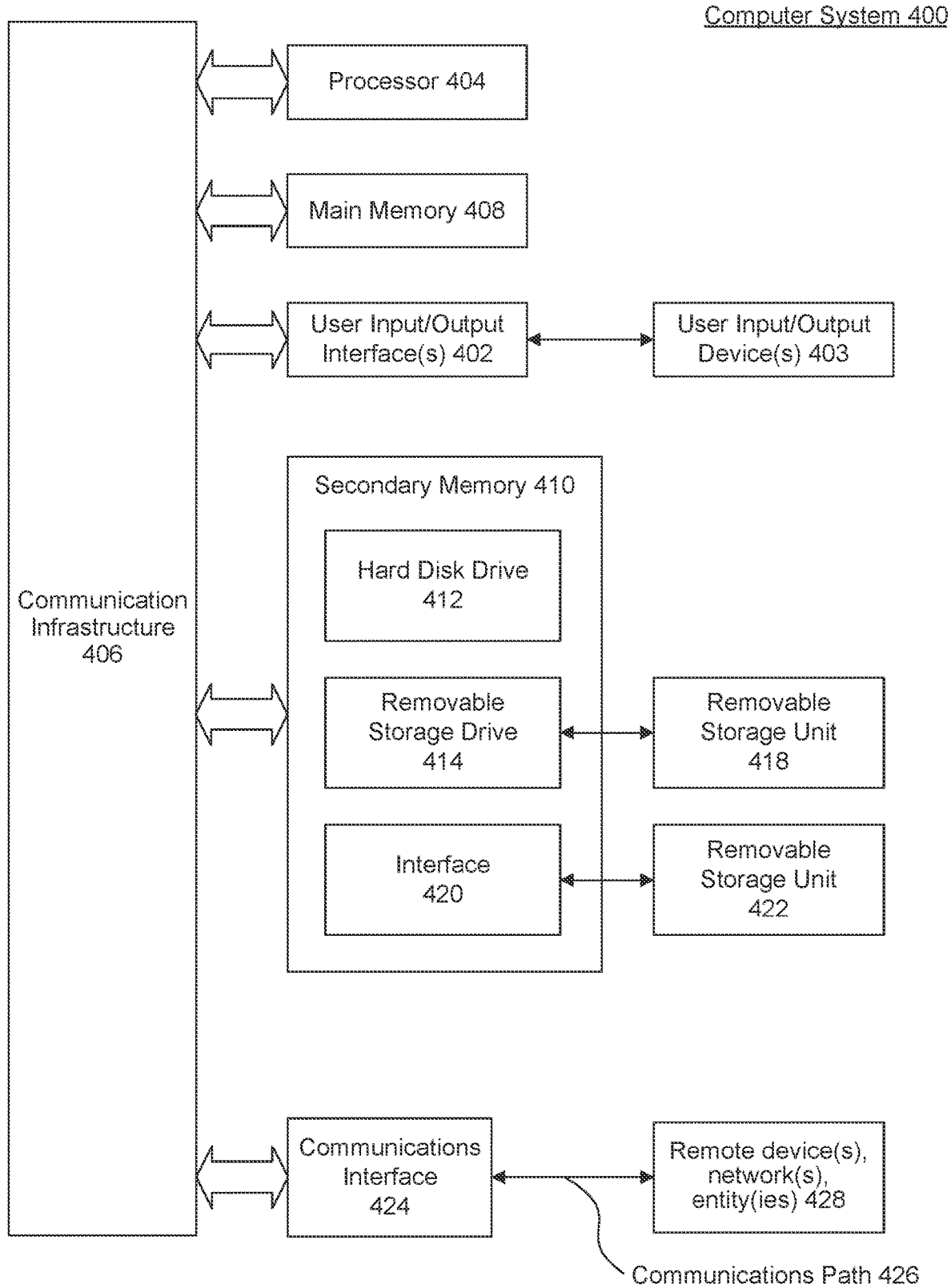
FIG. 4 illustrates an example computer system useful for implementing various embodiments.

Various embodiments and/or components therein can be implemented, for example, using one or more computer systems, such as computer system 400 shown in FIG. 4. Computer system 400 can be any computer or computing device capable of performing the functions described herein. For example, one or more computer systems 400 can be used to implement any embodiments, and/or any combination or sub-combination thereof.

Computer system 400 includes one or more processors (also called central processing units, or CPUs), such as a processor 404. Processor 404 is connected to a communication infrastructure or bus 406. Computer system 400 may represent or comprise one or more systems on chip (SOC).

One or more processors 404 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (i.e., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, memory card, and/any other computer data storage device. Removable storage drive 414 reads from and/or writes to removable storage unit 418 in a well-known manner.

According to an exemplary embodiment, secondary memory 410 can include other means, instrumentalities or other approaches for allowing computer programs and/or other instructions and/or data to be accessed by computer system 400. Such means, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can include any combination of LANs, WANs, the Internet, etc. Control logic and/or data can be transmitted to and from computer system 400 via communication path 426.

In some embodiments, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
  receiving a request to compare a first computing program to a second computing program, wherein each computing program comprises an address, one or more tables accessed by a respective computing program, one or more input parameters, and one or more output parameters;

calculating an address similarity measure between the address of the first computing program and the address of the second computing program;

calculating a table similarity measure between the one or more tables accessed by the first computing program and the one or more tables accessed by the second computing program;

calculating an input similarity measure between the one or more input parameters of the first computing program and the one or more input parameters of the second computing program;

calculating an output similarity measure between the one or more output parameters of the first computing program and the one or more output parameters of the second computing program;

providing the address similarity measure, table similarity measure, input similarity measure, and output similarity measure to a trained artificial intelligence (AI) model;

receiving from the trained AI model a similarity determination between the first computing program and the second computing program; and performing an action based on the similarity determination.

2. The method of claim 1, wherein the first computing program comprises a first application programming interface (API), and the second computing program comprises a second API.

3. The method of claim 1, wherein the address comprises a universal resource location (URL) address.

4. The method of claim 1, the calculating the input similarity measure comprises:

identifying the one or more input parameters for the first computing program;

generating a sentence structure based on a reformatting of the one or more input parameters of the first computing program; and providing the sentence structure to a sentence-BERT (bidirectional encoder representations from transformers) processor configured to compute the input similarity measure based on comparing two sentence structures.

5. The method of claim 4, wherein the generating comprises:

determining that a first one of the one or more input parameters for the first computing program comprises an object; and retrieving one or more parameters from the object, wherein the sentence structure includes one or more parameters from the object.

6. The method of claim 1, wherein the action comprises:

determining that the first computing program is similar to the second computing program based on the similarity determination;

determining that the similarity determination is above a threshold; and automatically opening a computing program editor configured to allow a user to edit either the first computing program or the second computing program.

7. The method of claim 1, wherein the action comprises:

determining that the first computing program is similar to the second computing program based on the similarity determination; and performing a deduplication based on the determination that the first computing program is similar to the second computing program.

8. A system comprising at least one processor, the at least one processor configured to perform operations comprising:

receiving a request to compare a first computing program to a second computing program, wherein each computing program comprises an address, one or more tables accessed by a respective computing program, one or more input parameters, and one or more output parameters;

calculating an address similarity measure between the address of the first computing program and the address of the second computing program;

calculating a table similarity measure between the one or more tables accessed by the first computing program and the one or more tables accessed by the second computing program;

calculating an input similarity measure between the one or more input parameters of the first computing program and the one or more input parameters of the second computing program;

calculating an output similarity measure between the one or more output parameters of the first computing program and the one or more output parameters of the second computing program;

providing the address similarity measure, table similarity measure, input similarity measure, and output similarity measure to a trained artificial intelligence (AI) model;

receiving from the trained AI model a similarity determination between the first computing program and the second computing program; and performing an action based on the similarity determination.

9. The system of claim 8, wherein the first computing program comprises a first application programming interface (API), and the second computing program comprises a second API.

10. The system of claim 8, wherein the address comprises a universal resource location (URL) address.

11. The system of claim 8, the calculating the input similarity measure comprises:

identifying the one or more input parameters for the first computing program;

generating a sentence structure based on a reformatting of the one or more input parameters of the first computing program; and providing the sentence structure to a sentence-BERT (bidirectional encoder representations from transformers) processor configured to compute the input similarity measure based on comparing two sentence structures.

12. The system of claim 11, wherein the generating comprises:

determining that a first one of the one or more input parameters for the first computing program comprises an object; and retrieving one or more parameters from the object, wherein the sentence structure includes one or more parameters from the object.

13. The system of claim 8, wherein each of the address similarity measure, table similarity measure, input similarity measure, and output similarity measure comprise a value between 0 and 1.

14. The system of claim 8, wherein the action comprises:
  determining that the first computing program is similar to the second computing program based on the similarity determination; and
  performing a deduplication based on the determination that the first computing program is similar to the second computing program.

15. The system of claim 8, wherein the action comprises:
  determining that the first computing program is similar to the second computing program based on the similarity determination;
  determining that the similarity determination is above a threshold; and
  automatically opening a computing program editor configured to allow a user to edit either the first computing program or the second computing program.

16. A non-transitory computer-readable medium having instructions stored thereon that, when executed by at least one computing device, cause the at least one computing device to perform operations comprising:
  receiving a request to compare a first computing program to a second computing program, wherein each computing program comprises an address, one or more tables accessed by a respective computing program, one or more input parameters, and one or more output parameters;
  calculating an address similarity measure between the address of the first computing program and the address of the second computing program;
  calculating a table similarity measure between the one or more tables accessed by the first computing program and the one or more tables accessed by the second computing program;
  calculating an input similarity measure between the one or more input parameters of the first computing program and the one or more input parameters of the second computing program;
  calculating an output similarity measure between the one or more output parameters of the first computing program and the one or more output parameters of the second computing program;
  providing the address similarity measure, table similarity measure, input similarity measure, and output similarity measure to a trained artificial intelligence (AI) model;
  receiving from the trained AI model a similarity determination between the first computing program and the second computing program; and
  performing an action based on the similarity determination.

17. The non-transitory computer-readable medium of claim 16, wherein the first computing program comprises a first application programming interface (API), and the second computing program comprises a second API.

18. The non-transitory computer-readable medium of claim 16, wherein the address comprises a universal resource location (URL) address.

19. The non-transitory computer-readable medium of claim 16, the calculating the input similarity measure comprises:
  identifying the one or more input parameters for the first computing program;
  generating a sentence structure based on a reformatting of the one or more input parameters of the first computing program; and
  providing the sentence structure to a sentence-BERT (bidirectional encoder representations from transformers) processor configured to compute the input similarity measure based on comparing two sentence structures.

20. The non-transitory computer-readable medium of claim 19, wherein the generating comprises:
  determining that a first one of the one or more input parameters for the first computing program comprises an object; and
  retrieving one or more parameters from the object, wherein the sentence structure includes one or more parameters from the object.

* * * * *